United States Patent [19]

Okano et al.

[11] Patent Number: 4,853,914
[45] Date of Patent: Aug. 1, 1989

[54] TIME BASE CORRECTION SYSTEM WITH COARSE AND FINE CORRECTION

[75] Inventors: Takashi Okano; Toru Akiyama; Masao Kanda, all of Tokorozawa, Japan

[73] Assignee: Pioneer Electronic Corporation, Tokyo, Japan

[21] Appl. No.: 168,246

[22] Filed: Mar. 15, 1988

[30] Foreign Application Priority Data

Mar. 16, 1987 [JP] Japan ................................. 62-61494

[51] Int. Cl.⁴ .......................... G11B 7/00; H04N 5/76
[52] U.S. Cl. ..................................... 369/32; 358/322; 358/339; 360/36.2
[58] Field of Search ............... 358/320, 321, 322, 337, 358/338, 339, 907; 369/32, 33; 360/36.1, 36.2

[56] References Cited

U.S. PATENT DOCUMENTS

| | | | |
|---|---|---|---|
| 4,069,499 | 1/1978 | Ninomiya | 358/19 |
| 4,165,524 | 8/1979 | Ninomiya | 358/148 |
| 4,287,529 | 9/1981 | Tatami et al. | 358/320 |
| 4,677,602 | 6/1987 | Okano et al. | 369/32 |

Primary Examiner—Robert L. Richardson
Attorney, Agent, or Firm—Fleit, Jacobson, Cohn, Price, Holman & Stern

[57] ABSTRACT

Method and apparatus of controlling time base for use in an information reading system in which information recorded on a recording medium is read by a pickup, write a read signal obtained by the pickup into a memory device and read-out the signal stored in the memory device by using a read-out reset signal so as to perform the time base control. Upon starting of a track jump operation of the information reading system, phases of generation of the read-out reset signal before and after the starting of the track jump operation is changed with each other.

5 Claims, 5 Drawing Sheets

TIME BASE CORRECTION SYSTEM WITH COARSE AND FINE CORRECTION

BACKGROUND OF THE INVENTION

1. Field of the Invention

The present invention relates to method and apparatus for controlling time base in a system for reading information recorded on a record medium such as a record disc or recording tape, and more specifically to time base control method and apparatus for use in a system for playing back video and/or audio signal recorded on the recording medium.

2. Description of Background Information

In a video disc player for example, a time base control method is adopted in which time base is coarsely adjusted by controlling the rotational speed of a spindle motor for rotating the recording disc, so as to control a relative speed between the recording disc and an information reading point of a pickup operating as a signal reading means. At the same time a fine adjustment of the time base is effected by supplying a playback signal obtained by the pickup to a variable delay element. Owing to the fall in price of memory devices, it has become increasingly frequent to adopt a method in which a memory is employed as the variable delay element for the fine control, a pulse train signal is generated in synchronism with the time base variation of the playback signal, and the playback signal is written in the memory device by using this pulse train signal, and subsequently read out from the memory device by means of a reference pulse signal which has a stable frequency.

With conventional time base control systems, however, if the jump operation is executed with a CLV (constant linear velocity) disc, a disturbance is generated in the phase difference between write and read reset pulses since the reproduced video signal becomes discontinuous. As result, there arises a shortcoming that the values in write and read address counters of the memory device approach to each other, so that the time base correction is not performed properly.

OBJECT AND SUMMARY OF THE INVENTION

An object of the present invention is therefore to provide a time base control method by which the time base correction is effected properly even immediately after jumping a plurality of tracks in a CLV disc.

Another object of the present invention is to provide a time base control apparatus by which the time base correction is effected properly even immediately after jumping a plurality of tracks in the CLV disc.

A time base control method according to the present invention is characterized by changing phases of generation of the read-out reset signal of the memory for the fine control of the time base before and after a starting of the track jump operation.

A time base control apparatus according to the present invention is characterized by a provision of device for changing phases of generation of the read-out reset signal of the memory for the fine control of the time base before and after a starting of the track jump operation.

DETAILED DESCRIPTION OF THE PREFERRED EMBODIMENTS

Before entering into the description of the preferred embodiments, an example of the conventional time base correction system will be explained with reference to the accompanying drawings.

Figure 6:
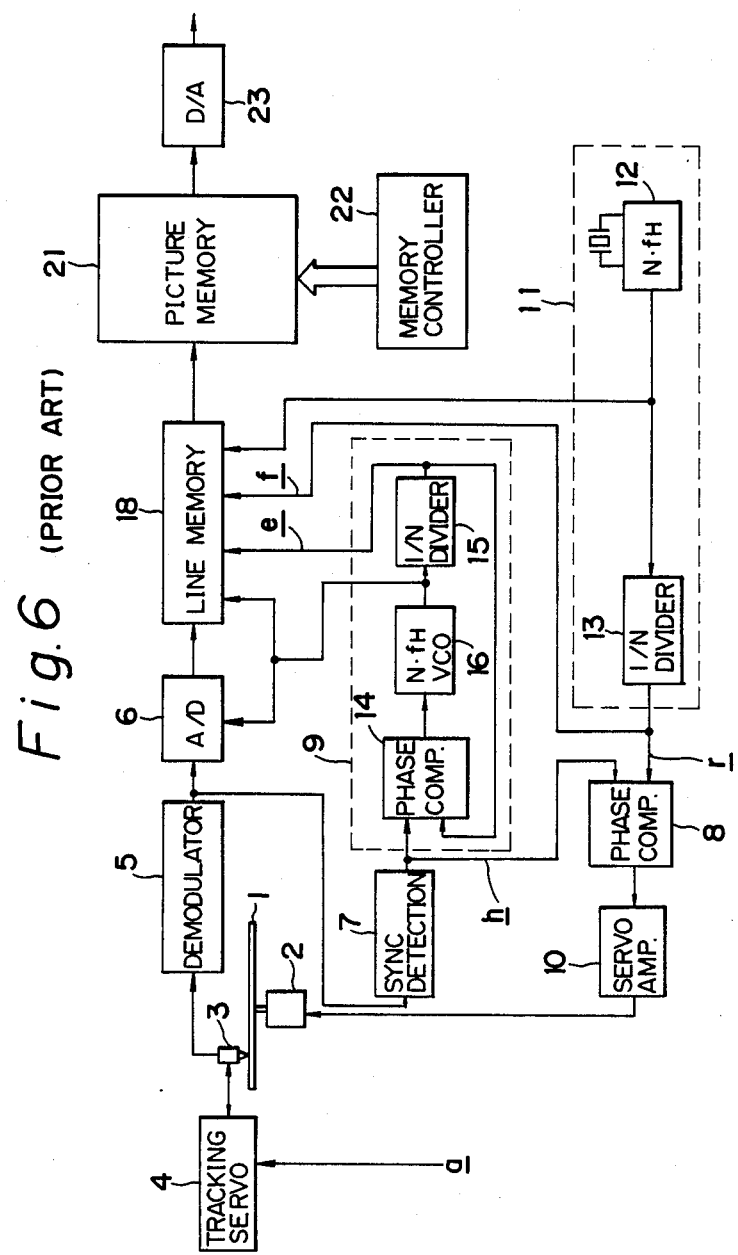
FIG. 6 is a block diagram showing a system according to a conventional method.

A video disc player in which a conventional time base control method is adopted is shown in FIG. 6. In FIG. 6, a recording disc is driven to rotate by means of a spindle motor 2. From the recording disc 1, an RF (Radio Frequency) signal carrying video information and others is read out by means of a pickup 3. A read spot of the pickup 3 is positioned in a radial direction of the recording disc 1 by means of a tracking servo mechanism 4 so as to trace a track formed on the recording disc 1. In a special playback mode requiring a jump operation (an operation of jumping a track) such as a scanning playback mode, the tracking servo mechanism 4 operates to cause a jump movement of the read spot of the pickup 3 in response to a jump command a supplied from a control circuit (not shown).

The RF signal read out from the recording disc 1 by means of the pickup 3 is supplied to a demodulation circuit 5 which comprises an FM demodulator for example. In the demodulation circuit 5, a video signal is reproduced and supplied to an A/D (Analog to Digital) converter 6 and a sync detection circuit 7. By the sync detection circuit 7, a horizontal synchronizing signal contained in the video signal is detected. The reproduced horizontal synchronizing signal h outputted from this sync detection circuit 7 is supplied to a phase comparator circuit 8 and a write pulse signal generating circuit 9. In the phase comparator circuit 8, phase comparison between the reproduced horizontal synchronizing signal h and a reference signal r of a predetermined frequency is effected to generate a phase difference detection signal corresponding to the phase difference between these two signals. As a spindle error signal, the phase difference detection signal is supplied to the spindle motor 2 which drives the disc through a servo amplifier 10. Thus, the speed of rotation of the recording disc 1 is controlled.

The reference signal r is outputted from a reference signal generating circuit 11. The reference signal generating circuit 11 comprises a crystal oscillator 12 which oscillates at a frequency N-times (N is a natural number) the frequency fH of the horizontal synchronizing signal, and a frequency divider 13 which divides an oscillation output signal of the crystal oscillator 12 by N, to generate the reference signal r.

In the write pulse signal generating circuit 9, the reproduced horizontal synchronizing signal h is supplied to a phase comparator circuit 14 in which it is compared in phase with an output signal of a frequency divider 15, and a phase difference detection signal corresponding to a phase difference between these two signals is generated. This phase difference detection signal is supplied to a VCO (Voltage Controlled Oscillator) 16. The voltage controlled oscillator 16 is designed so that its free-running frequency is substantially equal to a frequency N times the frequency fH of the horizontal synchronizing signal. An output signal of this VCO 16 is supplied to the frequency divider 15 in which it is divided by N. A PLL (Phase Locked Loop) is formed by the phase comparator circuit 14, the divider 15, and a signal which is synchronized in phase with the reproduced horizontal synchronizing signal h is outputted from the frequency divider 15. The output signal of the VCO 16 is supplied, as a sampling pulse signal, to the A/D converter 6 and, as a write clock signal, to a line memory 18. The output signal of the frequency divider 15 is supplied, as a write reset pulse signal e which is generated substantially at the same timing as the reproduced horizontal synchronizing signal h, to the line memory 18.

In the A/D converter 6, the video signal is sampled by means of the output signal of the VCO 16, and a digital signal representing sampled values obtained by the sampling is generated. Output data of this A/D converter 6 is supplied to the line memory 18. To the line memory 18, a reference signal r outputted from the frequency divider 13 in the reference signal generating circuit 11 is supplied, as a read-out reset pulse f along with the write clock signal and the write reset pulse e, and the output signal of the crystal oscillator 12 is supplied as a read-out clock signal. The line memory 18 includes for example a write address counter which is reset by the write reset pulse e and whose count value is varied in sequence by means of the write clock signal, and a read address counter which is reset by means of the read-out reset pulse f and whose count value is varied in sequence by means of the read-out clock signal, and constructed so that data is written into an address corresponding to output data of the write address counter every time the write clock signal is generated, and that data in an address corresponding to the output data of the read address counter is read-out every time the readout clock signal is generated.

Data read-out from the line memory 18 is supplied to a picture memory 21. The picture memory 21 has a memory capacity capable of storing data corresponding to 1 field of video information. Write and read-out operations into and from this picture memory 21 are controlled by means of a memory controller 22. The memory controller 22 performs a control such that writing is performed in sequence every time data is read-out from the line memory 18 by means of the read-out reset pulse f and the readout clock signal of the line memory 18, and data is readout in the same order as the writing by means of a command from a control circuit (not shown).

Data read out from the picture memory 21 is supplied to a D/A converter 23 in which the data is converted to an analog signal. A playback video signal is outputted from this D/A converter 23.

With the above construction, the rotation of the spindle motor 2 becomes unstable due to a disturbance of the continuity of the reproduced horizontal synchronizing signal h supplied to the phase comparator circuit 8 which is caused as a result of the jump operation during a scanning playback of a CLV disc, that is, a mode of operation in which the jump operation of the information reading point of the pickup 1 and the operation for following the recording track are performed alternately. On the other hand, in the event that the continuity of the reproduced horizontal synchronizing signal h is lost in the write pulse generating circuit 9 which controls the writing of data in the line memory 18 operating as the means for the fine control of the time base control, a disturbance occurs in the phase locked loop circuit generating the write clock signal, which in turn results in a shortcoming such that the writing and reading of data into and from the line memory occurs in a memory cell at the same time, and consequently the time base correction operation is disabled.

The operation of the line memory 18 will be explained with reference to FIGS. 7 through 9. in FIGS. 7 through 9, with the axis of ordinates being an axis of co-ordinates for values in the write and read address counters of the line memory 18, and the axis of abscissas being an axis of co-ordinates for time, the manner of variation of the value in the read address counter is shown by the solid line, and the manner of variation of the value in the write address counter is shown by the dashed line. The read address is shown by a perfect straight line because it is varied by the reference clock signal including no jitter. When the reading of data of 1H (one horizontal period) is completed, the read address counter is reset and the data is read from the head of address. Therefore, video data free of jitter is read out from the line memory 19.

On the other hand, the value of the write address counter shows a non-linear variation. Since the write clock is synchronized with the video signal including jitter, it will not change linearly with respect to time, and has a slight rolling.

The line memory 18 is constructed so that the read and write address counters are operated by independent clock signals, and the reading and writing take place at memory cells of designated addresses. Therefore, as shown in FIG. 7, the time base control is effected properly unless the values of the write and read address counters become identical with each other.

Figure 8:
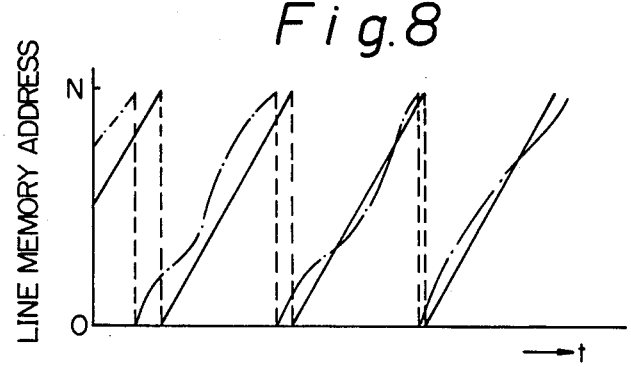
Figure 9:
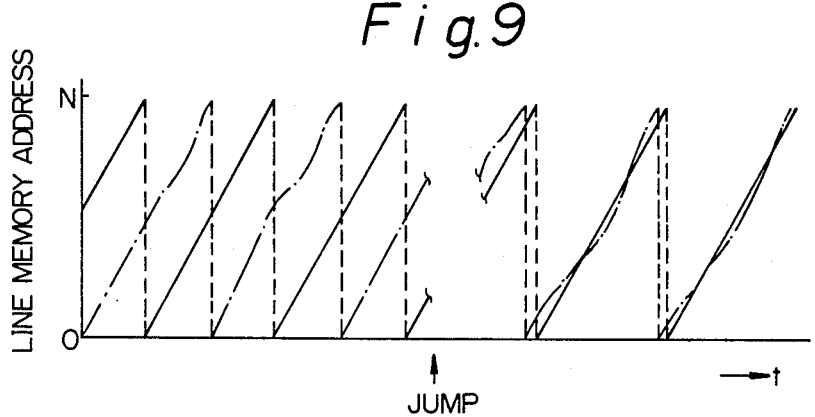

However, as shown in FIG. 8, in the event that the values of the write and read address counters become identical with each other so that there arises a state where accesses to a memory cell of the same address take place, or that an overtake of the address occurs, a time jump will appear in read out video data, and the time base control will not be effected properly.

Figure 7:
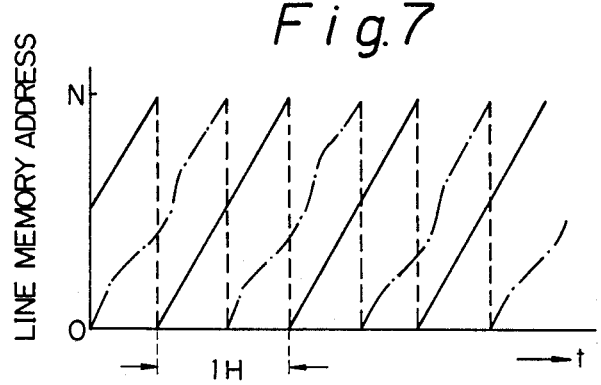
FIGS. 7 through 9 are diagrams showing the changes in the addresses of the line memory in the system of FIG. 6.

Therefore, as shown in FIG. 7, in order that the values in the write and read address counters will not approach to each other during the playback, it is only necessary to control the speed of the spindle motor 2 so that the phase difference between the write and read-out reset pulses e and f becomes equal to H/2 in average. Since the write reset pulse e is generated from the reproduced horizontal synchronizing signal h, the speed control of the spindle motor 2 is effected by the phase comparison between the reproduced horizontal synchronizing signal h and the read-out reset pulse f in the conventional system shown in FIG. 6.

However, as mentioned before, with the conventional system even if the phase difference between the write and read reset pulses e and f is maintained at H/2 during the normal playback operation, when the jump operation is executed with a CLV disc, a disturbance is generated in the phase difference between the write and read reset pulses e and f since the playback video signal becomes discontinuous. Therefore, as shown in FIG. 9, there arises a shortcoming that the values of the write and read address counters approach to each other, so that the time base correction is not performed properly.

Figure 1:
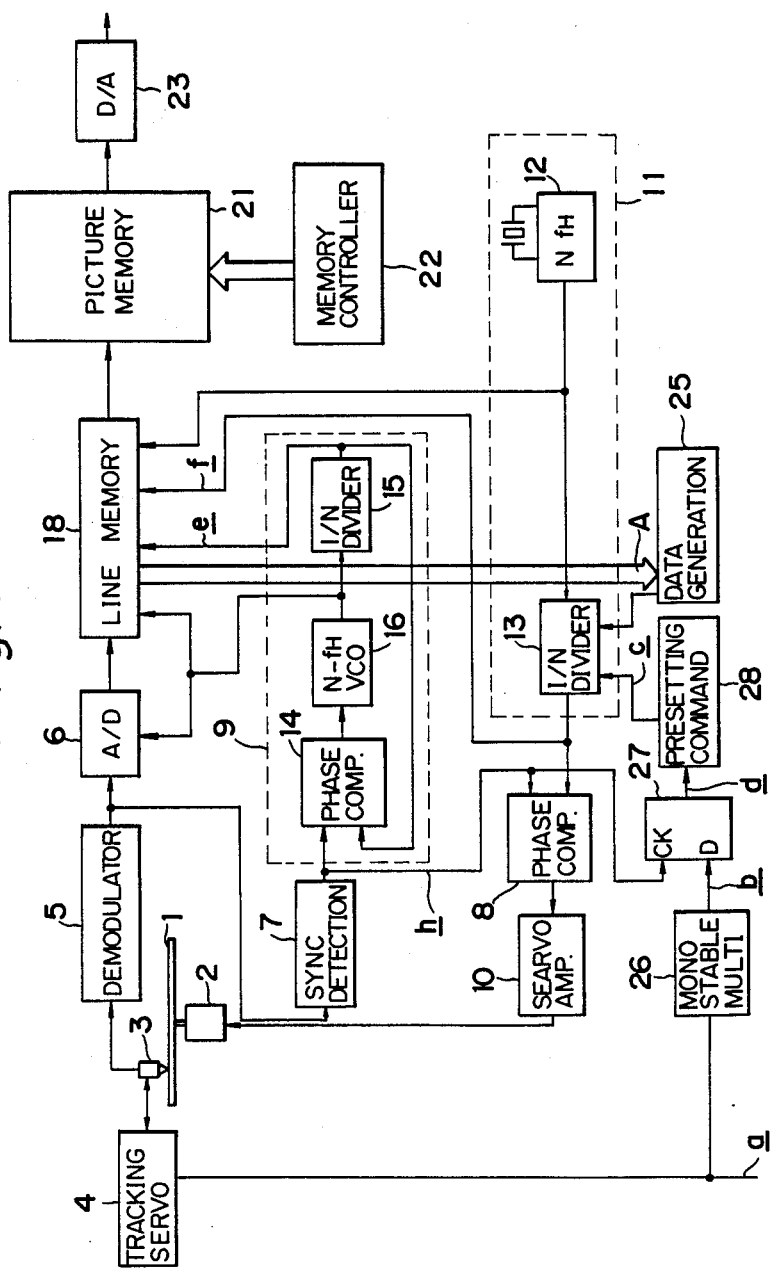
FIG. 1 is a block diagram showing an embodiment of the present invention.

Embodiments of the present invention will be explained in detail with reference to FIGS. 1 through 5. In FIG. 1, the recording disc 1, the spindle motor 2, the pickup 3, the tracking servo mechanism 4, the demodulation circuit 5, the A/D converter 6, the sync detection circuit 7, the phase comparator circuit 8, the write pulse signal generating circuit 9, the servo amplifier 10, the reference signal generating circuit 11, the lime memory 18, the picture memory 21, the remote controller 22, the D/A converter 23 are mutually connected in the same manner as in the system of FIG. 6. Since the operations of the above circuit elements are similar to those which have been explained before, the explanation thereof will not be repeated.

In this embodiment, the frequency divider 13 in the reference signal generating circuit 11 is made up of a presettable counter. To a presetting input terminal of this frequency divider 13, there is supplied output data of a data generation circuit 25. The count value of the write address counter of the line memory 18 is supplied, through a bus line A for example, to this data generation circuit 25. The data generation circuit 25 comprises, for example, an operation circuit which is adapted to add a value of N/2 when the count value is equal to or smaller than N/2, and to subtract the value N/2 when the count value is larger than N/2.

A jump command a is supplied as a trigger input of a monostable multivibrator (referred to as MMV hereinafter) 26. The inversion period of the MMV 26 is set to be longer than the period of a track jump operation. A $\overline{Q}$ output b of the MMV 26 is supplied to a D input of a D flip-flop 27. To the D flip-flop 27 there supplied is the reproduced horizontal sync signal h as a clock signal. A Q output signal d of this D flip-flop 27 is supplied to a presetting command pulse generation circuit 28 which for example comprises a differentiation circuit. When the D flip-flop 27 is set, a presetting command pulse c is outputted from the presetting command pulse generating circuit 28 and supplied to a presetting command input terminal of the frequency divider 13. By means of this presetting command pulse signal c, output data of the data generation circuit 25 is preset in the frequency divider 13 as a counting data.

Figure 2:
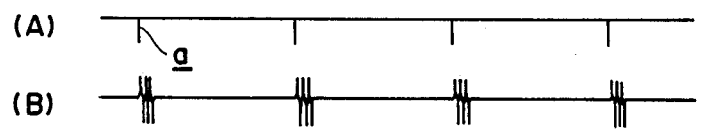
FIGS. 2 and 3 are waveform diagrams showing operations of each part of the system of FIG. 1.

With the above described arrangement, the jump command a is periodically generated during the scanning playback as shown in FIG. 2 (A), so that the jump operation is executed. Under this condition, the tracking error signal becomes as shown in FIG. 2 (B).

Figure 3:
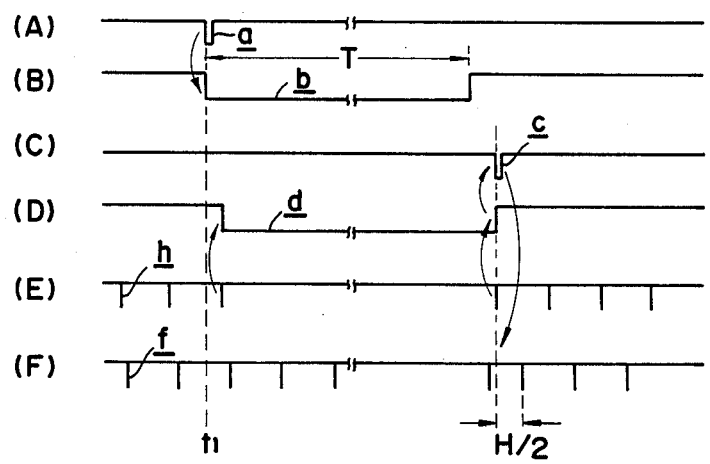

Referring to FIG. 3, operations of various parts of the system during a period of one of a plurality of jump operations in the scanning playback and periods immediately before and after that period will be explained. In the figure, (A) is a waveform diagram of the jump command a, (B) is a waveform diagram of the $\overline{Q}$ output b of the MMV 26, (C) is a waveform diagram of the presetting command pulse c, (D) is a waveform diagram of the Q output signal d of the D flip-flop 27, (F) is a waveform diagram of the read reset pulse f.

If a jump command a is generated at a time $t_1$, the track jump operation is started and the MMV is triggered to start the inversion operation. The period of inversion of this MMV 26 is set to be a time period T which is longer than the period of track jump operation, its $\overline{Q}$ output b has a low level for the time period T. Since this $\overline{Q}$ output signal b is latched by the D flip-flop 27 every time the reproduced horizontal synchronizing signal h is generated, the Q output signal d of the D flip-flop 27 forms pulses whose leading edge is synchronized with the reproduced horizontal synchronizing signal h after the completion of the track jump operation. The presetting command pulse c is outputted from the presetting command pulse generator 28 at the time of every leading edge of the Q output signal d. Then a predetermined value is set in the frequency divider 13.

Figure 4:
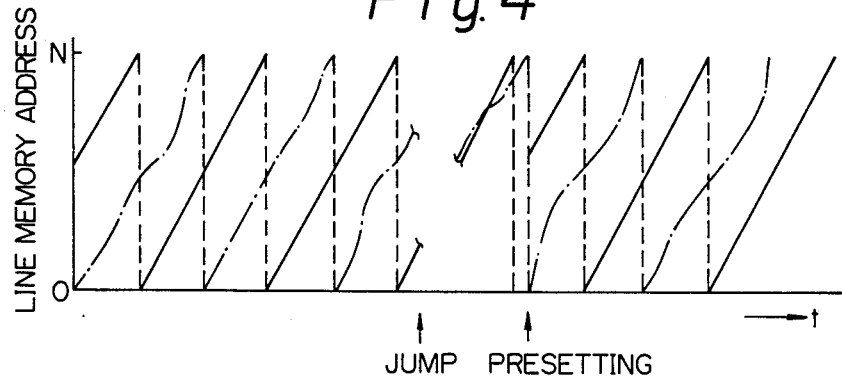
FIG. 4 is a diagram showing the changes in the addresses of the line memory in the system of FIG. 1.

In the embodiment described above, the presetting command pulse is generated upon reception of the first reproduced horizontal synchronizing signal h immediately after the turn over of the output signal of the MMV 26. At this time, the write reset pulse e is also generated, so that the count value of the write address counter is equal to 0. Therefore, the data generation circuit 25 outputs a value obtained by addition of N/2, and the value N/2 is preset in the frequency divider 13 which is made up of a presettable counter. As a result, the frequency divider 13 generates the read reset pulse f after the elapse of time period of H/2. Thus, such a condition that the read and write addresses become identical with each other in the line memory 18 is surely prevented as illustrated in FIG. 4. Also, even if the jitter on the writing side is considered, it is possible to preset so that there remains a sufficient phase difference.

Therefore, the values of the write and read address counters are varied as shown in FIG. 4, to prevent the generation of the overtake phenomenon of the address values, so that a good time base control operation will be performed.

In the above embodiment, the arrangement is shown in which the presetting is effected upon receipt of the reproduced horizontal synchronizing signal h. However, the arrangement is not limited to this. Even if the presetting occurs at an arbitrary timing, the data generation circuit 25 outputs a preset value which is always shifted from the count value of the write address counter by N/2. Therefore, the write and read addresses are prevented from become identical with each other.

Figure 5:
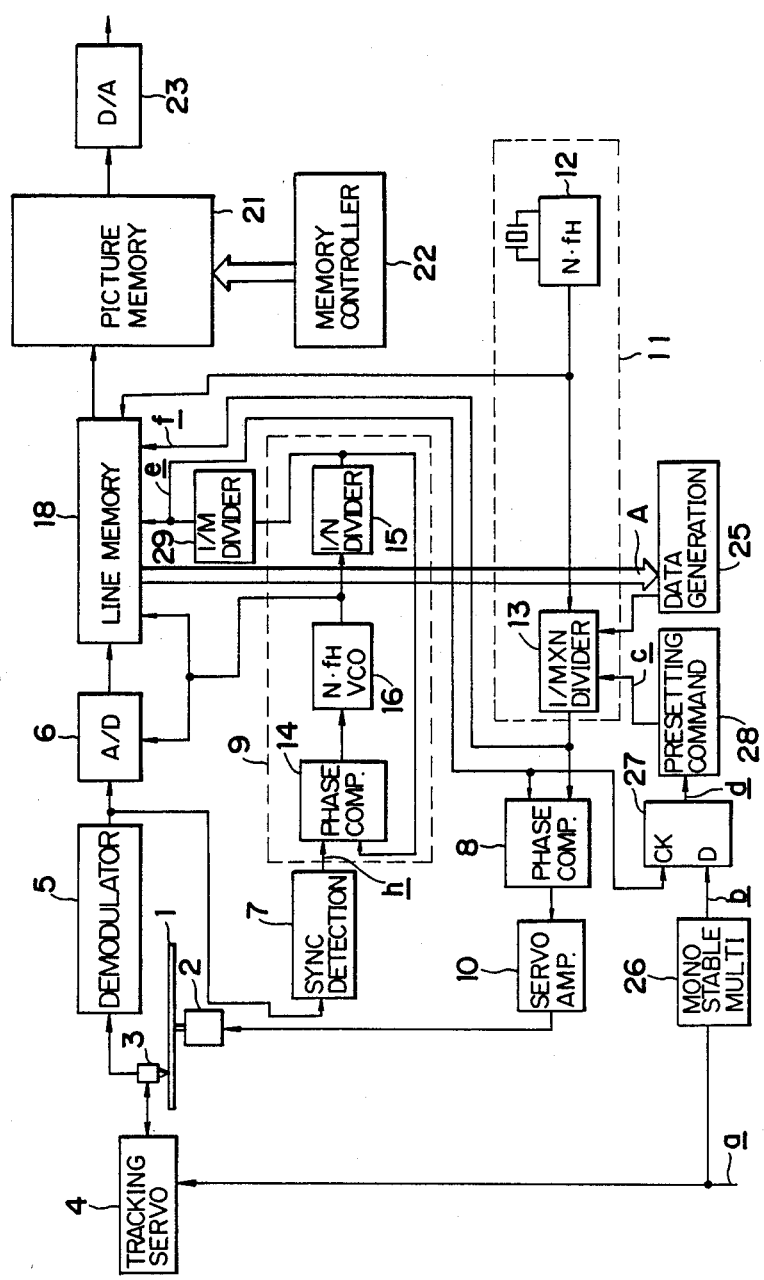
FIG. 5 is a block diagram showing another embodiment of the present invention.

In the foregoing, a case in which a memory which has a storage capacity for storing data of the amount of 1 line is used as the line memory 18 has been explained. FIG. 5 on the other hand shows an example of the system in which a memory having a memory capacity for storing data of the amount of M lines is used as the line memory 18. In the figure, each part of the system is constructed in the same manner as the system of FIG. 1 except that a frequency divider 29 for dividing the output signal of the frequency divider 15 by M is connected, and an output of this frequency divider 29 is supplied to the line memory 18 as the write reset pulse, and at the same time supplied to the phase comparator circuit 8 and the D flip-flop circuit 27 instead of the reproduced horizontal synchronizing signal h, and the frequency divider 13 is constructed to divide the input signal by M×N. In this construction, the supply of the write and read reset pulses e and f of the line memory 18 to the line memory 18 is effected every M lines so that the data is written into the whole memory area of the line memory.

On the other hand, the output signal of the frequency divider 29 and the reproduced horizontal synchronizing signal h are synchronized with each other by means of the PLL loop, the same action as in the system of FIG. 1 is effected although the output signal of the frequency divider 29 is supplied to the phase comparing circuit 8 and the D flip-flop 27.

In the above described embodiments the frequency divider 13 is preset in synchronism with the reproduced horizontal synchronizing signal h after the track jump operation. However, other methods are conceivable to set predetermined phases of the write and read reset pulses e and f on the line memory 18. For example, it is also possible to effect the presetting at timings which are not identical with the reproduced horizontal synchronizing signal h. Furthermore, it is possible to employ a method in which the presetting operation is executed at the same time as the start of the track jump operation or precedently to it, and the value is held while the preset state is maintained, and the preset state is released after the track jump operation so as to restart the count operation.

Moreover, in the above embodiments, the value preset in the frequency divider 13 is determined to be constant. However, it is possible to arrange the system such that the count value of the frequency divider 13 immediately before a track jump operation is memorized and the memorized value is preset in the frequency divider 13 after the track jump operation. This operation is equivalent to hold a previous value of the count value of the frequency divider 13. Therefore, as a simplest method, it is sufficient to stop the count operation of the frequency divider 13 during the output period (during the presence of the output signal d) of the flip-flop circuit 27.

Also, it is possible to change the preset value depending on the direction of the track jump operation. Specifically, when the number of jumped track is large and the linear velocity before and after the jump operation is changes greatly, the speed of the advancement of the write address becomes slower than the speed of the advancement of the read address in the case that the jump operation is directed to the inner periphery, and faster than it in the case that the jump operation is directed to the outer periphery. Taking this into account, it is conceivable to change the preset value, and the generation of the phenomenon of overtaking after the presetting can be prevented by such a provision.

In addition, the construction of the data generation circuit 25 is not limited to the operational circuit explained in the above description. For example, it is also possible to use a circuit which generates a predetermined value (such as N/2) at the same time as the generation of the reproduced horizontal synchronizing signal or the write reset pulse.

A described specifically in the above, the time base control method or apparatus according to the present invention is arranged so that the phase of the read reset pulse is reset so that the phase difference between the read and write reset pulses which respectively reset the values of the read and write address counters of the memory for the fine adjustment of the time base immediately after the completion of the jump operation. Therefore, the generation of a time gap of output signal due to the phenomenon of overtaking of address value after the jump operation is prevented even if a discontinuous part is generated in the read signal by the jump operation. Thus, a good time base control operation is performed.

What is claimed is:

1. A time base control method in which, in effecting a coarse control and a fine control of time base in accordance with a relative speed between a recording medium and a signal reading means for reading a signal from said recording medium, a read signal obtained by said signal reading means is written into a memory successively from a predetermined address of said memory by using a write reset signal synchronized in phase with a predetermined signal component contained in said read signal, and said read signal written in said memory is read-out successively from said predetermined address by using a read-out reset signal generated at predetermined intervals, said time base control method being characterized by changing phases of generation of said read-out reset signal before and after a starting of a track jump operation by which a signal detection point of said signal reading means moves from a track section to another track section of said recording medium.

2. A time base control method for use in a system for reading information from a recording medium by means of a signal reading means, said system adapted to effect a coarse control and a fine control of time base in accordance with a relative speed between the recording medium and the signal reading means, said time base control method comprising the steps of:
  writing a read signal obtained by said signal reading means into a memory successively from a predetermined address of said memory by using a write reset signal synchronized in phase with a predetermined signal component contained in said read signal;
  reading-out said read signal written in said memory successively from said predetermined address by using a read-out reset signal generated at predetermined intervals; and
  changing phases of generation of said read-out reset signal before and after a starting of a track jump operation by which a signal detection point of said signal reading means moves from a track section to another track section of said recording medium.

3. A time base control method as set forth in claim 2, wherein said step for changing phases of generation of read-out reset signal includes a step for resetting the phase of the read-out reset signal immediately after the completion of a track jump operation so that the phase difference between the read-out and write reset signals becomes equal to a predetermined value.

4. A time base control apparatus for use in a system for reading information from a recording medium by means of a signal reading means, said system adapted to effect a coarse control and a fine control of time base in accordance with a relative speed between the recording medium and the signal reading means, said time base control apparatus comprising:
  writing means for writing a read signal obtained by said signal reading means into a memory successively from a predetermined address of said memory by using a write reset signal synchronized in phase with a predetermined signal component contained in said read signal;
  reading means for reading-out said read signal written in said memory successively from said predetermined address by using a read-out reset signal generated at predetermined intervals; and
  control means for changing phases of generation of said read-out reset signal before and after a starting of a track jump operation by which a signal detection point of said signal reading means moves from a track section to another track section of said recording medium.

5. A time base control apparatus as set forth in claim 4, wherein said control means include means for resetting the phase of the read-out reset signal immediately after the completion of a track jump operation so that the phase difference between the readout and write reset signals becomes equal to a predetermined value.

* * * * *